United States Patent
Imai et al.

(10) Patent No.: US 6,247,660 B1
(45) Date of Patent: Jun. 19, 2001

(54) PROCESS FOR HYDROGEN-PULVERIZING A RARE EARTH METAL-BASED MAGNETIC MATERIAL, AND HYDROGEN-PULVERIZING CASE

(75) Inventors: Yasuhiko Imai; Koki Tokuhara, both of Hyogo; Katsumi Okayama, Kusatsu; Akiyasu Oota, Ibaraki; Akihito Tsujimoto, Wakayama, all of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/413,353

(22) Filed: Oct. 6, 1999

(30) Foreign Application Priority Data

Oct. 7, 1998 (JP) .................................................. 10-300392

(51) Int. Cl.$^7$ .................................................. B02C 19/12
(52) U.S. Cl. .................................................. 241/30
(58) Field of Search .......................................... 241/30, 1

(56) References Cited

U.S. PATENT DOCUMENTS

| | | | |
|---|---|---|---|
| 5,595,608 | * | 1/1997 | Takebuchi et al. . |
| 5,728,355 | * | 3/1998 | Asada . |
| 5,753,386 | * | 5/1998 | Inaba et al. . |
| 5,843,372 | * | 12/1998 | Hasebe et al. . |

FOREIGN PATENT DOCUMENTS 4-147908  5/1992  (JP) .

* cited by examiner

*Primary Examiner*—Mark Rosenbaum
(74) *Attorney, Agent, or Firm*—Armstrong, Westerman, Hattori, McLeland & Naughton, LLP

(57) ABSTRACT

A case for hydrogen-pulverizing a rare earth metal-based magnetic material is disclosed. The case includes a case body which is formed of a material having a heat conductivity of 1 W/cm·deg or more. At least one heat-transferring/releasing member is mounted in the case body and formed of a material having a heat conductivity of 1 W/cm·deg or more. The magnetic material is accommodated in the case and subjected to a hydrogen pulverization with hydrogen occluded in the magnetic material. Thus, the heating and cooling of the magnetic material can be performed in a short time, thereby achieving the pulverization of the magnetic material with an extremely excellent

5 Claims, 5 Drawing Sheets

PROCESS FOR HYDROGEN-PULVERIZING A RARE EARTH METAL-BASED MAGNETIC MATERIAL, AND HYDROGEN-PULVERIZING CASE

BACKGROUND OF THE INVENTION

1. Field of the Invention

The present invention relates to a process for hydrogen-pulverizing a rare earth metal-based magnetic material for producing an alloy powder for a permanent magnet made from, for example, R (which is at least one of rare earth elements including Y), B and Fe as main components, and to a hydrogen pulverizing case used in the hydrogen pulverizing process.

2. Description of the Related Art

The conventional pulverization of such a type of a magnetic material is carried out in the following manner: An alloy ingot having a preselected composition corresponding to that of a rare earth metal-based magnet to be produced, is embrittled by occluding hydrogen ($H_2$) thereinto in a hydrogen gas ($H_2$) atmosphere by utilizing an $H_2$ occluding property of the alloy ingot, thereby producing a coarse powder of rare earth metal-based magnetic material efficiently and in a short time.

In the conventional hydrogen pulverization of the rare earth metal-based magnetic material, however, the magnetic material is embrittled with occlusion of hydrogen, and risen in temperature up to 300° C. to 350° C. by an exothermic reaction during occlusion of hydrogen. Thereafter, to enhance the oxidation resistance of the magnetic material pulverized, it is necessary to further heat the magnetic material to 400° C. to 600° C. in vacuum or in an inert atmosphere to release a portion of occluded hydrogen. However, even if the hydrogen is released, the rare earth metal-based magnetic material is active and liable to be oxidized at a high temperature. For this reason, it is necessary to cool the magnetic material to a level on the order of 20° C. to 30° C. by an inert gas such as argon gas and then remove the cooled magnetic material into the atmosphere. Particularly, a rare earth metal-based magnetic material produced by a strip casting process which will be described hereinafter is in the form of flakes and hence, has a large surface after pulverization, as compared with a material produced in a mold-casting process. Unless the rare earth metal-based magnetic material is removed after being cooled reliably to the level on the order of 20° C. to 30° C., there is a possibility that a firing occurs. When the rare earth metal-based-magnetic material in the form of the flakes produced by the strip casting process is placed into a pulverizing container, the flakes are placed one onto another and for this reason, an inner part of the material in the container is more difficult to cool, as compared with a rare earth metal-based magnetic material in the form of an ingot produced by a mold-casting process. Therefore, in the hydrogen pulverizing process governed by the thermal treatment of such heating and cooling, it is a subject for enhancing the productivity to conduct the heating and cooling in a short time.

SUMMARY OF THE INVENTION

Accordingly, it is an object of the present invention to provide a process for hydrogen-pulverizing a rare earth metal-based magnetic material, wherein the above subject is solved, and the heating and cooling can be performed in a short time, thereby providing an extremely excellent productivity, and to provide a hydrogen pulverizing case suitable for use in such hydrogen pulverizing process.

To achieve the above object, according to a first aspect and feature of the present invention, there is provided a case for hydrogen-pulverizing a rare earth metal-based magnetic material accommodated in the case with hydrogen occluded in the magnetic material, the case comprising a case body which is formed of a material having a heat conductivity of 1 W/cm·deg or more.

According to a second aspect and feature of the present invention, in addition to the first feature, the case body is formed of a material having a heat conductivity of 2.35 W/cm·deg or more.

According to a third aspect and feature of the present invention, in addition to the second feature, the case body is formed of copper or a copper alloy.

According to a fourth aspect and feature of the present invention, there is provided a case for hydrogen-pulverizing a rare earth metal-based magnetic material accommodated in the case with hydrogen occluded in the magnetic material, the case comprising a case body which is formed of a material having a heat conductivity of 1 W/cm·deg or more, and at least one heat-transferring/releasing member mounted in the case body and each formed of a material having a heat conductivity of 1 W/cm·deg or more.

According to a fifth aspect and feature of the present invention, in addition to the fourth feature, the case body and/or the heat-transferring/releasing member is formed of a material having a heat conductivity of 2.35 W/cm·deg or more.

According to a sixth aspect and feature of the present invention, in addition to the fifth feature, the case body and/or the heat-transferring/releasing member is formed of copper or a copper alloy.

According to a seventh aspect and feature of the present invention, in addition to the fourth feature, the heat-transferring/releasing member is a heat-transferring/releasing fin.

According to an eighth aspect and feature of the present invention, in addition to the fourth feature, the heat-transferring/releasing member is a rod-like member spanned between sidewalls of the case body.

According to a ninth aspect and feature of the present invention, in addition to the eighth feature, the rod-like member is a hollow pipe mounted between the opposite sidewalls of the case and having, at opposite ends, openings which are in communication with the outside air.

According to a tenth aspect and feature of the present invention, in addition to the fourth feature, the heat-transferring/releasing member is mounted at such a level that it is embedded in the rare earth metal-based magnetic material.

According to an eleventh aspect and feature of the present invention, there is provided a case for hydrogen-pulverizing a rare earth metal-based magnetic material accommodated in the case with hydrogen occluded in the magnetic material, the case comprising a case body, and at least one heat-transferring/releasing member comprising a hollow pipe mounted between the opposite sidewalls of the case and having, at opposite ends, openings which are in communication with the outside air, the heat-transferring/releasing member being mounted in the case body at such a level that it is embedded in the magnetic material in the case body.

According to a twelfth aspect and feature of the present invention, in addition to the first feature, the case body is placed within a reinforcing bottom frame which is formed of a material having a heat conductivity of 1 W/cm·deg or more and surrounding the entire bottom of the case body.

According to a thirteenth aspect and feature of the present invention, in addition to the twelfth feature, the case body and/or the reinforcing bottom frame is formed of a material having a heat conductivity of 2.35 W/cm·deg or more.

According to a fourteenth aspect and feature of the present invention, in addition to the thirteenth feature, the case body and/or the reinforcing bottom frame is formed of copper or a copper alloy.

According to a fifteenth aspect and feature of the present invention, in addition to the fourteenth feature, the case body is placed within a reinforcing bottom frame formed of a material having a heat conductivity of 1 W/cm·deg or more and surrounding the entire bottom of the case body.

According to a sixteenth aspect and feature of the present invention, in addition to the fifteenth feature, the case body and/or the reinforcing bottom frame is formed of a material having a heat conductivity of 2.35 w/cm·deg or more.

According to a seventeenth aspect and feature of the present invention, in addition to the sixteenth feature, the case body and/or the reinforcing bottom frame is formed of copper or a copper alloy.

According to an eighteenth aspect and feature of the present invention, in addition to the first feature, a reinforcing portion having a reinforcing member wrapped in an upper end edge of each of sidewalls of the case body is formed.

According to a nineteenth aspect and feature of the present invention, in addition to the eighteenth feature, the case body is formed of copper or a copper alloy.

According to a twentieth aspect and feature of the present invention, in addition to the fourth feature, a reinforcing portion having a reinforcing member wrapped in an upper end edge of each of sidewalls of the case body is formed.

According to a twenty first aspect and feature of the present invention, in addition to the twentieth feature, the case body is formed of copper or a copper alloy.

According to a twenty second aspect and feature of the present invention, there is provided a process for hydrogen-pulverizing a rare earth metal-based magnetic material with hydrogen occluded in the rare earth metal-based magnetic material, comprising the steps of accommodating the rare earth metal-based magnetic material into a hydrogen pulverizing case according to the first aspect, and subjecting the rare earth metal-based magnetic material to a pulverizing treatment with occlusion of hydrogen.

According to a twenty third aspect and feature of the present invention, in addition to the twenty second feature, the rare earth metal-based magnetic material is an R—Fe—B based alloy in the form of flakes having an average thickness in a range of 0.1 mm to 2.0 mm.

According to a twenty fourth aspect and feature of the present invention, there is provided a process for hydrogen-pulverizing a rare earth metal-based magnetic material with hydrogen occluded in the rare earth metal-based magnetic material, comprising the steps of accommodating the rare earth metal-based magnetic material into a hydrogen pulverizing case according to the fourth aspect, and subjecting the rare earth metal-based magnetic material to a pulverizing treatment with occlusion of hydrogen.

According to a twenty fifth aspect and feature of the present invention, in addition to the twenty fourth feature, the rare earth metal-based magnetic material is an R—Fe—B based alloy in the form of flakes having an average thickness in a range of 0.1 mm to 2.0 mm.

According to a twenty sixth aspect and feature of the present invention, there is provided a process for hydrogen-pulverizing a rare earth metal-based magnetic material with hydrogen occluded in the rare earth metal-based magnetic material, comprising the steps of accommodating the rare earth metal-based magnetic material into a hydrogen pulverizing case according to the eleventh aspect, and subjecting the rare earth metal-based magnetic material to a pulverizing treatment with occlusion of hydrogen.

According to a twenty seventh aspect and feature of the present invention, in addition to the twenty sixth feature, the rare earth metal-based magnetic material is an R—Fe—B based alloy in the form of flakes having an average thickness in a range of 0.1 mm to 2.0 mm.

With the features, the hydrogen pulverizing case and process ensure that the heating and the cooling of the magnetic material can be conducted in a short time, thereby providing an excellent productivity.

The above and other objects, features and advantages of the invention will become apparent from the following description of the preferred embodiment taken in conjunction with the accompanying drawings.

DETAILED DESCRIPTION OF THE PREFERRED EMBODIMENTS

The present invention will now be described by way of embodiments shown in the accompanying drawings.

Figure 1:
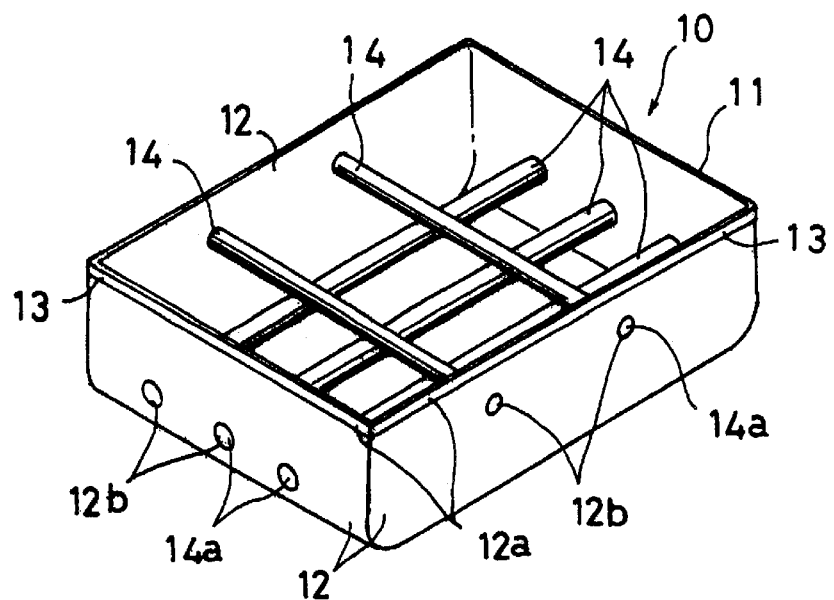
FIG. 1 is a perspective view of one embodiment of a case for hydrogen-pulverizing a rare earth metal-based magnetic material according to the present invention.
Figure 2:
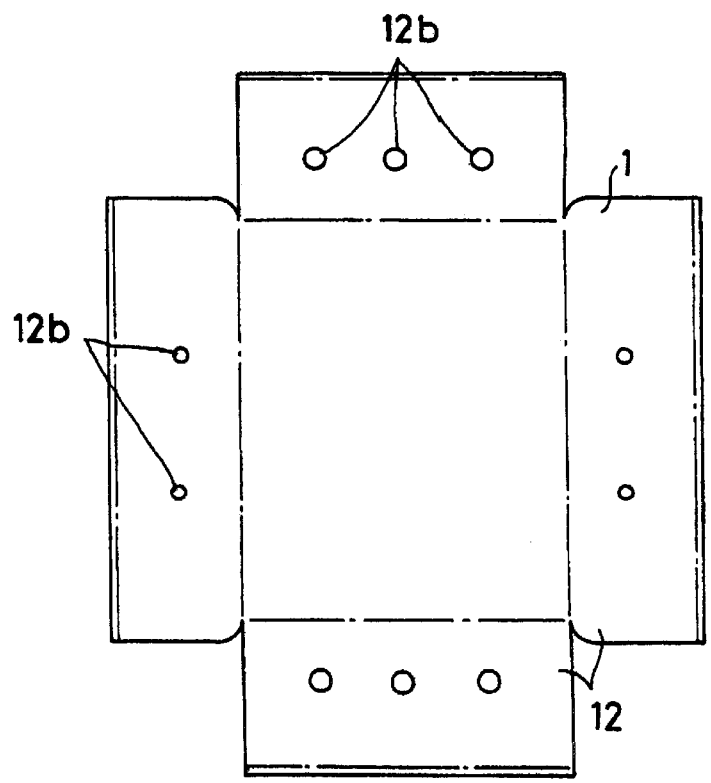
FIG. 2 is a development view of a copper plate material for forming a case body of the hydrogen-pulverizing case.

In Figures, reference character 10 designates a case for pulverizing a rare earth metal-based magnetic material with hydrogen occluded according to the present invention. The case 10 includes a base body 11 which is formed into a rectangular parallelepiped box-like configuration (255 mm×185 mm×70 mm) which is shown in FIG. 1 with its top portion opened and which is made from a copper plate material 1 having a thickness of 1.3 mm by folding the copper plate material 1 which is in a developed state shown in FIG. 2, and welding it.

Figure 3:
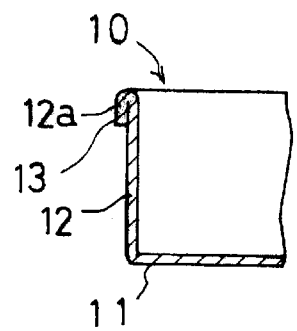
FIG. 3 is an enlarged sectional view of a reinforcing portion of the hydrogen-pulverizing case.

Upper end edges 12a of sidewalls 12 of the case body 11 are folded back for reinforcement to form reinforcing portions 13, as shown in FIG. 3, so that even when the case body 11 is heated, it is difficult to deform, whereby a shape-retaining property is provided to the case body. In other words, as a shape retaining property is improved, the thickness of the copper plate can be decreased, and the heating and cooling times can be shortened.

By conducting the hydrogen pulverization of a rare earth metal-based material by the hydrogen-pulverizing case having the case body formed of a material having a heat conductivity of 1 W/cm·deg or more in the above manner, it is ensured that in conducting a heating treatment upon releasing of hydrogen, a heat is transferred uniformly and rapidly with a good heat transfer to the magnetic material within the case. Thus, a good heating treatment can be achieved in a short time. In conducting a cooling treatment after releasing of hydrogen, the heat is released likewise uniformly and rapidly from the magnetic material within the case. Therefore, it is possible to perform the hydrogen pulverization of the rare earth metal-based magnetic material with an extremely excellent productivity.

In the present embodiment, the case body 11 is formed of the copper material, but if a material having a heat conductivity of 1 W/cm·deg or more such as an aluminum alloy and the like is used, the same effect can be obtained. It is preferable that the case body 11 is formed of a material having a heat conductivity of 2.35 W/cm·deg or more such as the copper, an aluminum and the like.

Examples of materials having a good heat conductivity and a hydrogen resistance are silver, copper, molybdenum and the like, but the use of silver which is a noble metal is realistically not preferred in respect of the cost. If the processability such as welding is taken into consideration, it is considered that molybdenum is difficult to process, and the use of copper or a copper-based alloy is desirable, because the heat conductivity of copper is more excellent than that of molybdenum. It is desirable for a similar reason that copper or a copper alloy is used for forming a heat-transferring/releasing member and a lower reinforcing frame which will be described hereinafter.

In this embodiment, three heat-transferring/releasing members 14 each comprising a hollow copper pipe having an outside diameter of 12 mm and an inside diameter of 9 mm are mounted between the shorter sidewalls 12, 12 of the case body 11 at a level corresponding to the middle of the height of the sidewalls 12 in such a manner that openings 14a at opposite ends thereof are in communication with the outside air. Two heat-transferring/releasing members 14 each comprising a hollow copper pipe having an outside diameter of 10 mm and an inside diameter of 8 mm are also mounted between the longer sidewalls 12, 12 of the case body 11 above the above-described hollow copper pipes in such a manner that openings 14a at opposite ends thereof are in communication with the outside air.

The mounting of the heat-transferring/releasing members 14 in the case body 11 ensures that even if the magnetic material is in the form of a flake made by a strip-casting process, the magnetic material accommodated within the case body 11 can be heated rapidly through the heat-transferring/releasing members 14, and the heat of the magnetic material can be released rapidly.

Especially, by mounting the heat-transferring/releasing members 14 at such a level that it is embedded in the magnetic material within the case body 11 as in the embodiment, it is possible to heat the inside of the magnetic material within the case body 11 and to release the heat from the inside of the magnetic material and thus, an extremely good heating/heat-releasing effect is obtained. Further, the strength of the sidewalls of the case body 11 can be increased by mounting of such heat-transferring/releasing members, and hence, the plate material can be formed thinly. As a result, the heating and heat-releasing treatments through the plate material 1 can be carried out quickly.

Figure 4:
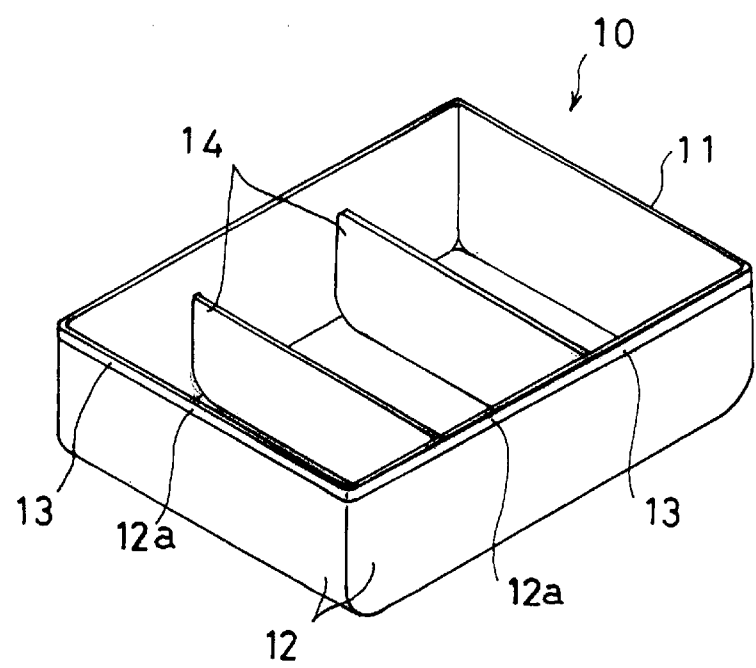
FIG. 4 is a perspective view of another embodiment of a case for hydrogen-pulverizing a rare earth metal-based magnetic material according to the present invention.
Figure 5:
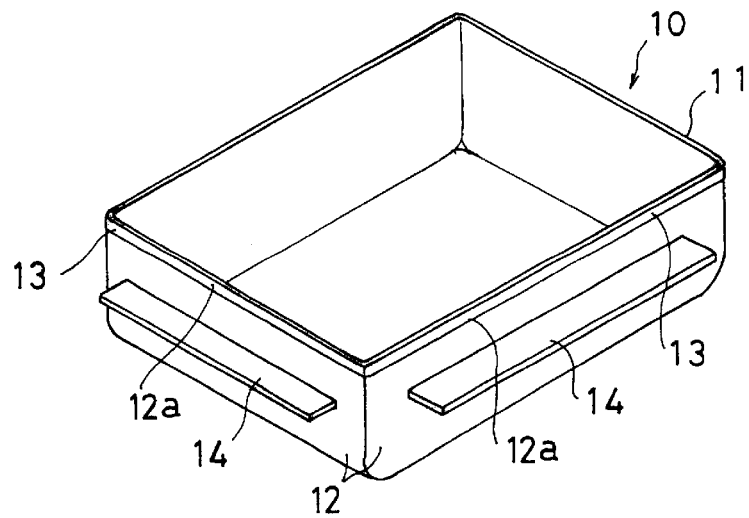
FIG. 5 is a perspective view of a further embodiment of a case for hydrogen-pulverizing a rare earth metal-based magnetic material according to the present invention.

The hollow copper pipe has been used as the heat-transferring/releasing member 14 in the embodiment, but the heat-transferring/releasing member 14 is not limited to such a hollow pipe-like shape, and a rod-like material having any shape such as rounded and square rod materials and the like or a material having a fin-like shape as shown in FIGS. 4 and 5 or the like may be used. In addition, any number of the heat-transferring/releasing members 14 maybe provided at anyplace. In FIGS. 4 and 5, portions or members corresponding to those in the above-described embodiment are designated by like reference characters, and the description of them is omitted.

The heat-transferring/releasing member 14 has been formed of the copper material in the embodiment, but if a material having a heat conductivity of 1 W/cm·deg or more such as an aluminum alloy or the like is used for forming heat-transferring/releasing member 14, as for the case body 11, a similar effect can be obtained. However, it is preferable that the heat-transferring/releasing member 14 is formed of a material having a heat conductivity of 2.35 W/cm·deg or more such as copper and aluminum.

Figure 6:
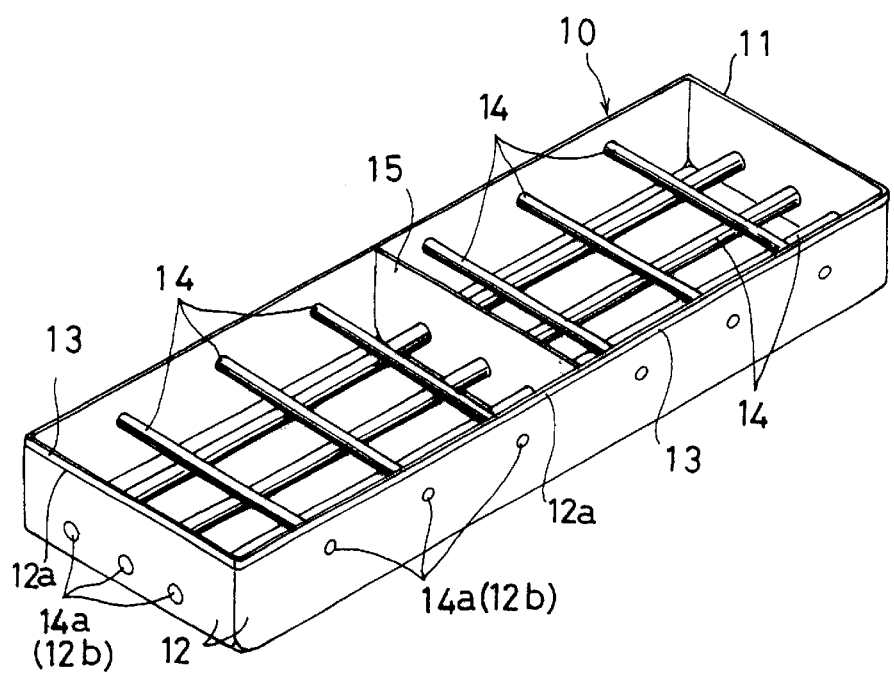
FIG. 6 is a perspective view of a yet further embodiment of a case for hydrogen-pulverizing a rare earth metal-based magnetic material according to the present invention.

FIG. 6 shows another embodiment of a hydrogen pulverizing case according to the present invention. The pulverizing case includes a case body 11 formed as a rectangular parallelepiped box (500 mm×185 mm×85 mm) with its top portion opened, which is longer than that in the above-described embodiment, with a mass productivity taken into consideration. A partition plate 15 made of a copper material is mounted at a central portion of the case body 11. Three heat-transferring/releasing members 14 each comprising a hollow copper pipe having an outside diameter of 12 mm and an inside diameter of 9 mm are mounted between shorter sidewalls 12, 12 about at a level corresponding to the middle of the height of the sidewalls 12 to extend through the partition plate 15, in such a manner that openings 14a at opposite ends thereof are in communication with the outside air. Six heat-transferring/releasing members 14 each comprising a hollow copper pipe having an outside diameter of 10 mm and an inside diameter of 8 mm are mounted between longer sidewalls 12, 12 above the hollow copper pipes in such a manner that openings 14a at opposite ends thereof are in communication with the outside air. In this embodiment, the opposite ends of each of the hollow copper pipes do not protrude out of the openings 12b in the sidewalls of the case, but may protrude out of the openings 12b in the sidewalls.

The present embodiment is aimed at an increase in one throughput for the same period of time as a treating period of time in the hydrogen pulverizing case shown in FIG. 1. If the treating period of time is intended to be shortened, while increasing the depth of the case, more time is taken for heating and cooling of the inside of the magnetic material, as the case is deeper as shown in FIG. 6. For this reason, the depth of the case has a limit, and the case must be thin.

Figure 7:
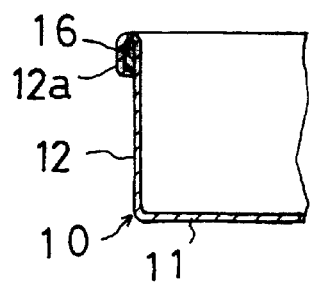
FIG. 7 is an enlarged sectional view of a reinforcing portion of the hydrogen pulverizing case.

In this embodiment, in a state in which the magnetic material has been filled in the case, the total weight is in a range of 20 kg to 25 kg and hence, it is difficult to handle the pulverizing case containing the magnetic material therein by a human power, and the pulverizing case containing the magnetic material therein must be handled in an automated system, and for this reason, particularly, an upper portion of the case requires a strength. Therefore, in the present invention, a stainless steel material 16 is wrapped in a reinforcing portion 13 formed at an upper end edge of each sidewall 12 of the case body 11, as shown in FIG. 7, so that the reinforcing portion 13 has a larger strength. This provides a sufficient toughness without increase in thickness of the plate-like sidewalls and hence, a heat conductivity to the magnetic material similar to that in the embodiment shown in FIG. 2 could be ensured.

Figure 8:
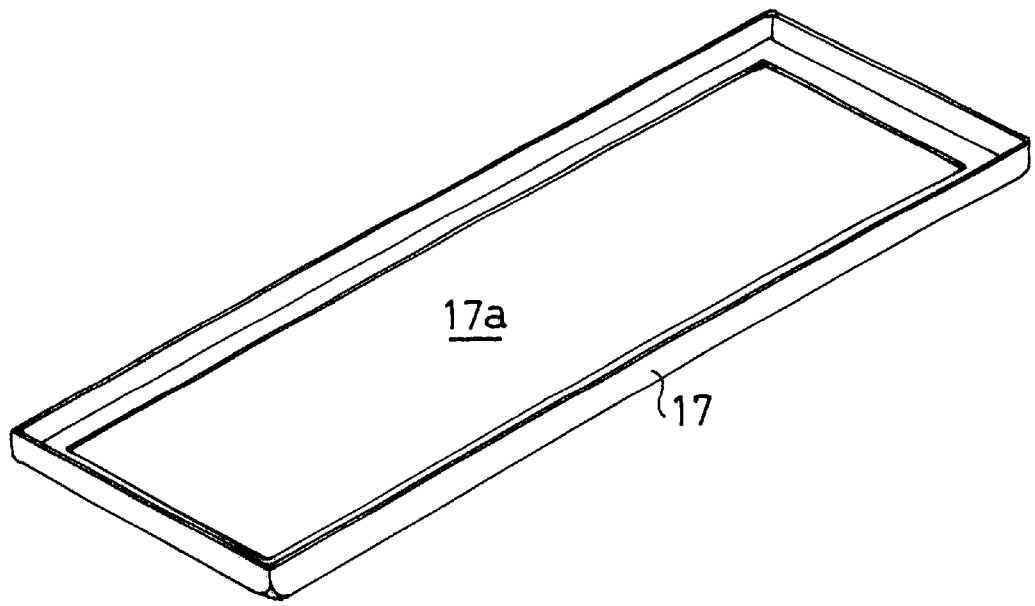
FIG. 8 is a perspective view of a reinforcing bottom frame.
Figure 9:
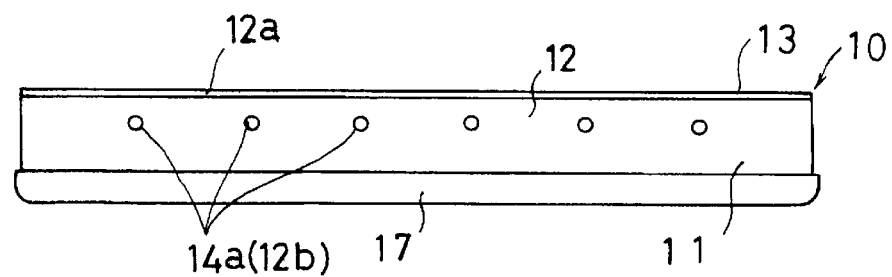
FIG. 9 is a side view of the hydrogen pulverizing case with the reinforcing bottom frame mounted thereto.

In the automated system, the case is transported on rollers, a force is applied to sides of the case to insert and remove the case into and from the hydrogen furnace by a machine (not shown). For this reason, when the case is formed of a soft material such as copper, a problem is arisen in the durability. Therefore, in this embodiment, the case body 11 is placed on a dish-like reinforcing bottom frame 17 which has an opening 17a in its bottom and is formed from a copper material to surround the entire bottom of the case body 11, as shown in FIGS. 8 and 9.

The reinforcing bottom frame has been formed of the copper material in this embodiment, but if a material having a heat conductivity of 1 W/cm·deg or more such as an aluminum alloy or the like is used for forming the bottom frame, as for the case body or the heat-transferring/releasing member, a similar effect can be obtained. It is preferable that the bottom frame is formed of a material having a heat conductivity of 2.35 W/cm·deg or more such as copper and aluminum. However, if the strength is made more account of than the heat conductivity, it is required that the bottom frame is formed of a stainless steel or the like.

Then, the hydrogen pulverization of a magnetic material for producing a coarse alloy powder for a permanent magnet made of R (which is at least one of rare earth elements including Y), B and Fe as main components was carried out actually, using the large-sized hydrogen pulverizing case shown in FIG. 6.

Figure 10:
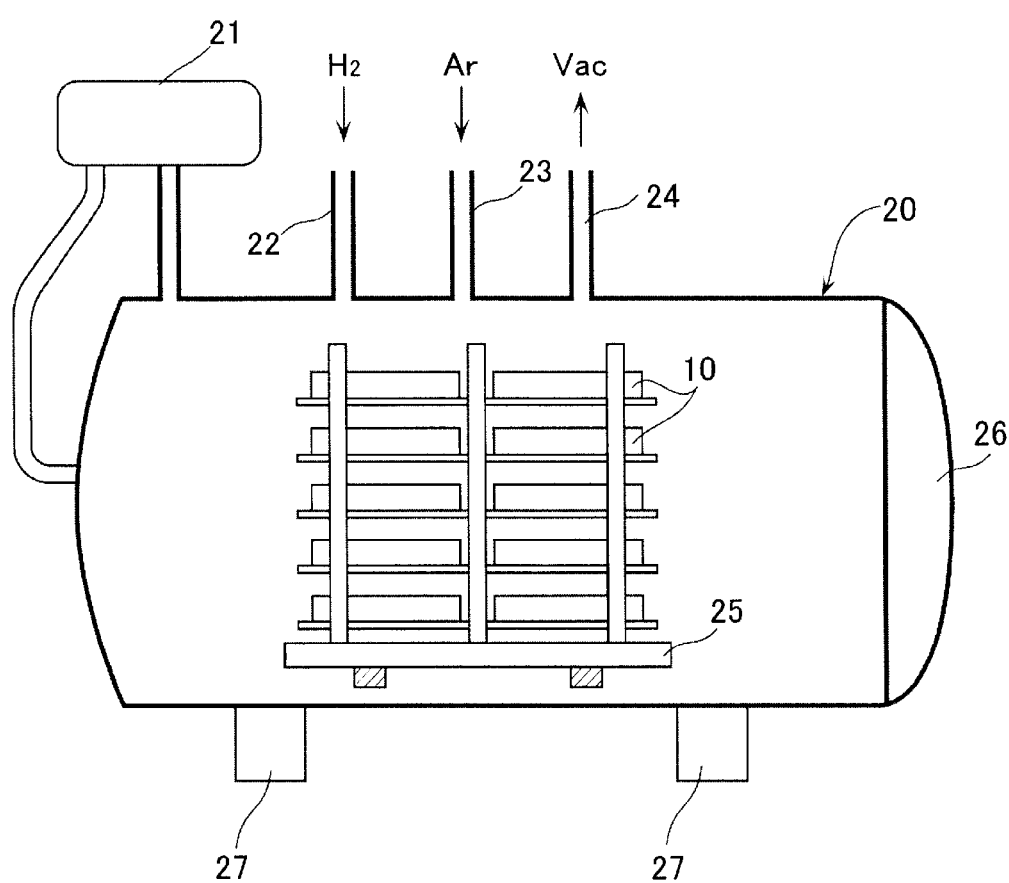
FIG. 10 is a front cross sectional view of a hydrogen-pulverizing batch furnace with the hydrogen pulverizing case accommodated therein.

A batch furnace 20 as shown in FIG. 10 is used for this pulverizing treatment. Mounted to the batch furnace 20 are a chiller 21 for cooling the inside of the batch furnace, an $H_2$ supply pipe 22, an Ar supply pipe 23, and an evacuating pipe 24 connected to a vacuum pump. The case having the magnetic material contained therein was accommodated in a rack 25 within the furnace, as shown in FIG. 10. In FIG. 10, reference character 26 indicates a lid for the furnace, and reference character 27 in FIG. 10 indicates a support leg for the furnace.

A magnetic material having a composition comprising 31Nd-1B-68Fe (% by weight) was prepared as a material to be pulverized, and was accommodated in an amount of 18 kg into the hydrogen pulverizing case of this embodiment. The case containing the magnetic material was placed into a hydrogen pulverizing chamber, and the hydrogen pulverizing chamber was evacuated to 0.05 Torr. Then, hydrogen gas was introduced to occlude hydrogen in the magnetic material in an hydrogen gas atmosphere of 2 atm provided within the pulverizing chamber. In this case, the occlusion of hydrogen was performed in an exothermic reaction and hence, the temperature of the magnetic material within the case was risen up to 350° C.

Then, to release the hydrogen occluded in the magnetic material from the magnetic material to enhance the oxidation resistance of the magnetic material, the temperature was risen up to 600° C. by a heater (not shown) provided in the furnace, while evacuating the pulverizing chamber. The heating and the evacuation were maintained until the degree of vacuum within the pulverizing chamber reached 0.1 Torr.

Thereafter, Ar gas was introduced into the pulverizing chamber to 1 atm, and the inside of the chamber was cooled to room temperature by fan-cooling, while operating the chiller 21.

In this case, 4.7 hours were required for the heating for releasing of hydrogen, and 5.2 hours were required for the cooling to room temperature.

The magnetic material used was a material produced by a strip casting process. More specifically, as shown in U.S. Pat. No. 5,383,978, the magnetic material was produced by melting, for example, an alloy having a composition comprising 31Nd-1B-68Fe (% by weight) by a high-frequency melting process in an Ar gas atmosphere to provide a molten material, and maintaining the molten material at 1,350° C. and then quenching the molten material on a single roll. Cooling conditions at this time were such that the peripheral speed of the roll was about 1 m/sec, the cooling rate was 500° C./sec, and the subcooling degree was 200° C. By quenching and solidifying the molten material in the above manner, a flake-like solidified alloy having an average thickness of 0.3 mm was produced.

A portion of iron (Fe) in the composition of the above-described alloy may be substituted by cobalt (Co), and another alloy having a composition shown in U.S. Pat. No. 4,770,723 by the present applicant may be used.

The produced alloy was to be coarsely pulverized into a flake-like shape having a particle size on the order of 5 mm by a feather mill. Then, the coarsely pulverized alloy by the above treatment was finely pulverized into an average particle size of 3.5 microns by a jet mill, and the resulting material was oriented in a magnetic field of 16 KOe and subjected to a pressure molding under a pressure of 1.5 t/cm² to provide a molded product having a width of 10 mm, a height of 10 mm and a length of 20 mm. This molded product was sintered for one hour at 1050° C. in an argon (Ar) gas atmosphere. Then, the sintered material was subjected to an aging for one hour at 600° C. in an argon (Ar) gas atmosphere, thereby providing a sintered magnet. The magnet had magnetic characteristics such that a coercive force was 13.5 KOe, a residual flux density was 13.9 KOe and a maximum energy product was 17.1 MGOe.

Then, the hydrogen pulverization of a magnetic material similar to that described above was carried out using a hydrogen pulverizing case having the same size and comprising a mere box made of a stainless steel of SUS304 in place of the abovedescribed hydrogen pulverizing case made of copper. In this case, unlike the above-described embodiment, 6.2 hours were required for the heating for releasing of hydrogen, and 6 hours were required for the subsequent cooling.

In the present embodiment, it was confirmed that the heating and cooling could be carried out extremely effectively in a short time, as compared with the case where the conventional hydrogen pulverizing case was used.

What is claimed is:

1. A process for hydrogen-pulverizing a rare earth metal-based magnetic material with hydrogen occluded in the rare earth metal-based magnetic material, comprising the steps of accommodating the rare earth metal-based magnetic material into a case for hydrogen pulverizing a rare earth metal-based magnetic material, said case comprising a case body and a hollow pipe-shaped heat-transferring/releasing member which is spanned between side walls of the case body, and subjecting the rare earth metal-based magnetic material to a pulverizing treatment with occlusion of hydrogen.

2. A process for hydrogen-pulverizing a rare earth metal-based magnetic material according to claim 1, wherein said rare earth metal-based magnetic material is an R—Fe—B based alloy in the form of flakes having an average thickness in a range of 0.1 mm to 2.0 mm.

3. A process for hydrogen-pulverizing a rare-earth metal-based magnetic material according to claim 1, wherein said case body is formed of a material having a heat conductivity of 1 W/cm·deg or more.

4. A process for hydrogen-pulverizing a rare earth metal-based magnetic material with hydrogen occluded in the rare earth metal-based magnetic material, comprising the steps of accommodating the rare earth metal-based magnetic material into a case for hydrogen pulverizing a rare earth metal-based magnetic material, said case comprising a case body which is formed of a material having a heat conductivity of 1 W/cm·deg or more and a heat-transferring/releasing member which is formed of a material having a heat conductivity of 1 W/cm·deg or more, is a hollow pipe communicating with outside air through opposite openings, is spanned between side walls of the case body, and is mounted at such a level that it is embedded in the rare earth metal-based magnetic material, and subjecting the rare earth metal-based magnetic material to a pulverizing treatment with occlusion of hydrogen.

5. A process for hydrogen-pulverizing a rare earth metal-based magnetic material according to claim 4, wherein said rare earth metal-based magnetic material is an R—Fe—B based alloy in the form of flakes having an average thickness in a range of 0.1 mm to 2.0 mm.

* * * * *